US011024038B2

(12) United States Patent
Heck

(10) Patent No.: US 11,024,038 B2
(45) Date of Patent: Jun. 1, 2021

(54) DISPLAY DEVICE MOTION EXCLUSION FROM HOME SURVEILLANCE MOTION DETECTION

(71) Applicant: Comcast Cable Communications, LLC, Philadelphia, PA (US)

(72) Inventor: Jeanine Heck, Wynnewood, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 80 days.

(21) Appl. No.: 16/263,231

(22) Filed: Jan. 31, 2019

(65) Prior Publication Data

US 2020/0250834 A1 Aug. 6, 2020

(51) Int. Cl.
| | |
|---|---|
| G06K 9/32 | (2006.01) |
| G06K 9/00 | (2006.01) |
| G06T 7/246 | (2017.01) |
| G06T 7/60 | (2017.01) |
| G06T 3/00 | (2006.01) |
| G06T 3/60 | (2006.01) |

(52) U.S. Cl.
CPC ............ *G06T 7/246* (2017.01); *G06K 9/3233* (2013.01); *G06T 3/0006* (2013.01); *G06T 3/608* (2013.01); *G06T 7/60* (2013.01)

(58) Field of Classification Search
None
See application file for complete search history.

(56) References Cited

U.S. PATENT DOCUMENTS

| | | | |
|---|---|---|---|
| 2017/0109613 A1* | 4/2017 | Kolavennu | .......... G06K 9/6262 |
| 2018/0074581 A1* | 3/2018 | Melman | ............. G06K 9/00597 |
| 2018/0278894 A1* | 9/2018 | Kanga | ................ G06K 9/00369 |

OTHER PUBLICATIONS

Simeunovic et al., "Applying Object Recognition To Reduce False Alarms Triggered By Motion Detection In Video Surveillance", Master's Thesis | Lund University 2018 (Year: 2018).*

* cited by examiner

*Primary Examiner* — Randolph I Chu
(74) *Attorney, Agent, or Firm* — Banner & Witcoff, Ltd.

(57) ABSTRACT

Systems, apparatuses, and methods are described for allowing a motion-detecting system to distinguish and/or mask motion that originates from a display screen. One method includes: capturing, by a computing device associated with a motion detector, an image of a field of view of the motion detector. The computing device may determine, based on object recognition, one or more candidate display areas within the image of the field of view. Based on the determined candidate display areas within the image, the computing device may generate a mask corresponding to the field of view. The computing device may exclude, from motion detection, motion occurring within the mask of the field of view.

45 Claims, 7 Drawing Sheets

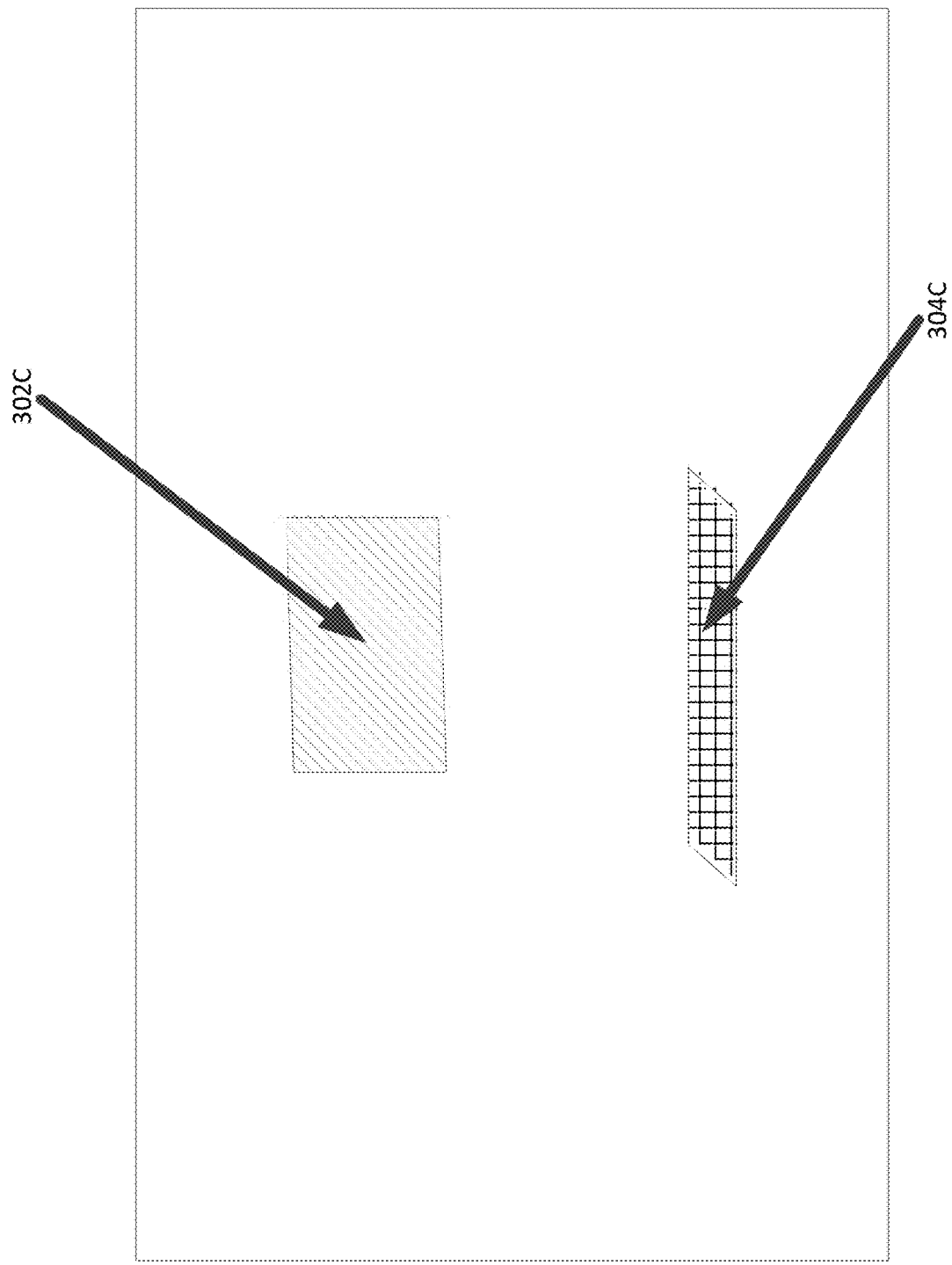

DISPLAY DEVICE MOTION EXCLUSION FROM HOME SURVEILLANCE MOTION DETECTION

BACKGROUND

While motion detectors may identify motion events in a camera feed and alert customers based on those events, motion detectors may not necessarily differentiate various kinds of motion. For example, moving images on a television display might be confused for actual motion occurring within the room, and could result in a false triggering of an alarm. It may also be burdensome, time-intensive, and impractical for customers to manually exclude a zone based on where the television is, or expect customers to know where reflections of the television may exist, in order to create zones of interest for those reflections as well.

The present disclosure may address one or more of the shortcomings described above.

SUMMARY

The following summary presents a simplified summary of certain features. The summary is not an extensive overview and is not intended to identify key or critical elements.

Systems, apparatuses, methods, and non-transitory computer readable media are described for allowing a motion-detecting system to distinguish and/or mask motion that originates from a display screen. Object recognition may be used to identify potential display screens within a field of view of one or more motion-sensing camera(s). One or more control images may be displayed on display screens within the field of view, and those control images may be used to determine locations of the display screens within the field of view. Those locations may then be masked and/or flagged for additional processing for future motion detection. To determine the control images, the system may access information indicating one or more video programs that are being displayed, and may obtain current images from a source of those video programs.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3C shows an exemplary field of view for a motion detection system identifying masked areas.

DETAILED DESCRIPTION

Figure 1:
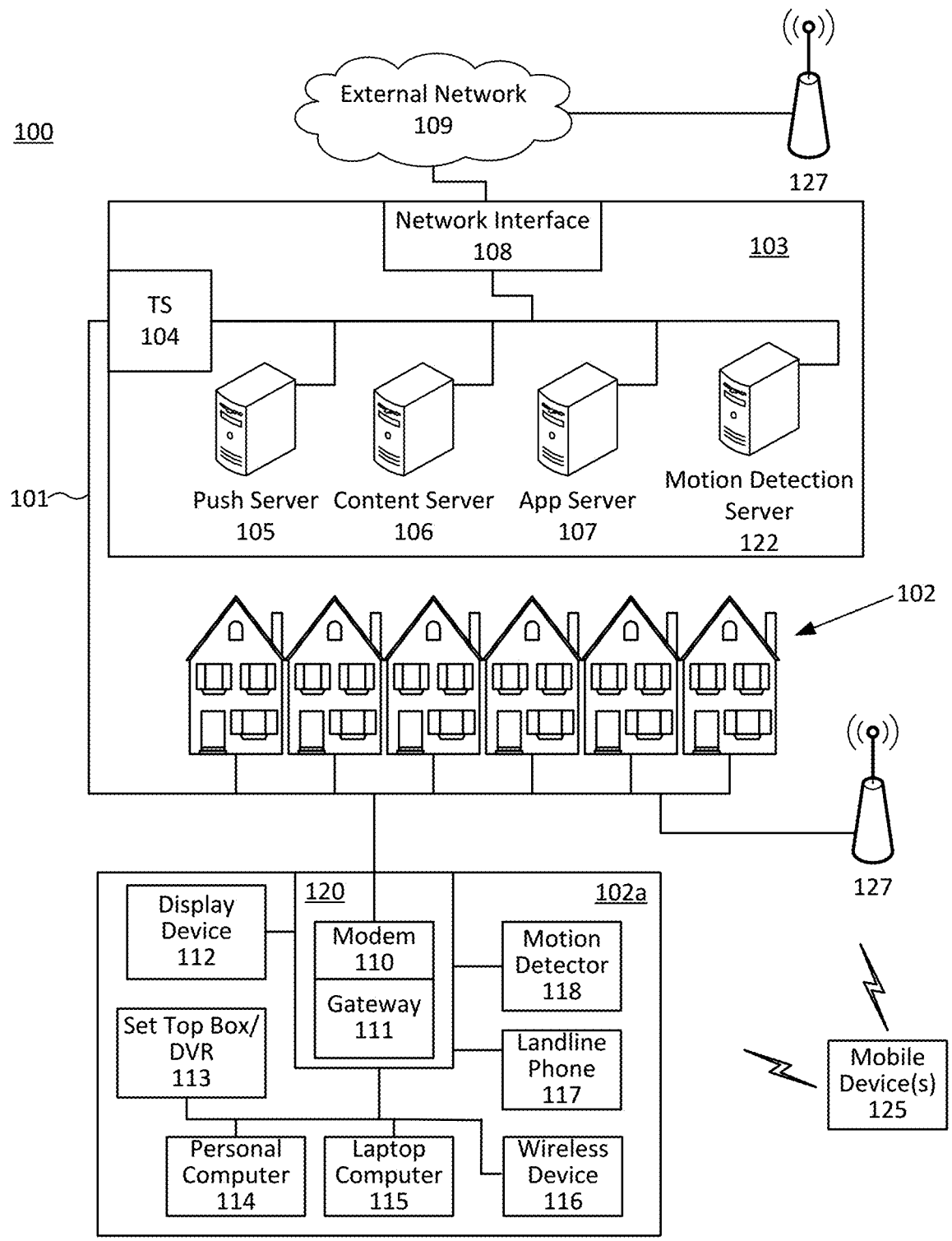
FIG. 1 shows an example communication network on which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106

(or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the motion detection server 122 (described below), additional push, content, and/or application servers, and/or other types of servers. Although shown separately, the push server 105, the content server 106, the application server 107, the motion detection server 122, and/or other server(s) may be combined. In another embodiment, instead of a motion detection server 122, one or more of servers 105, 106, and 107 may perform methods for excluding motion from a standalone motion detection system within a premise 102 (e.g., a home). The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), motion detector(s) 118 ("motion detector device" 118), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
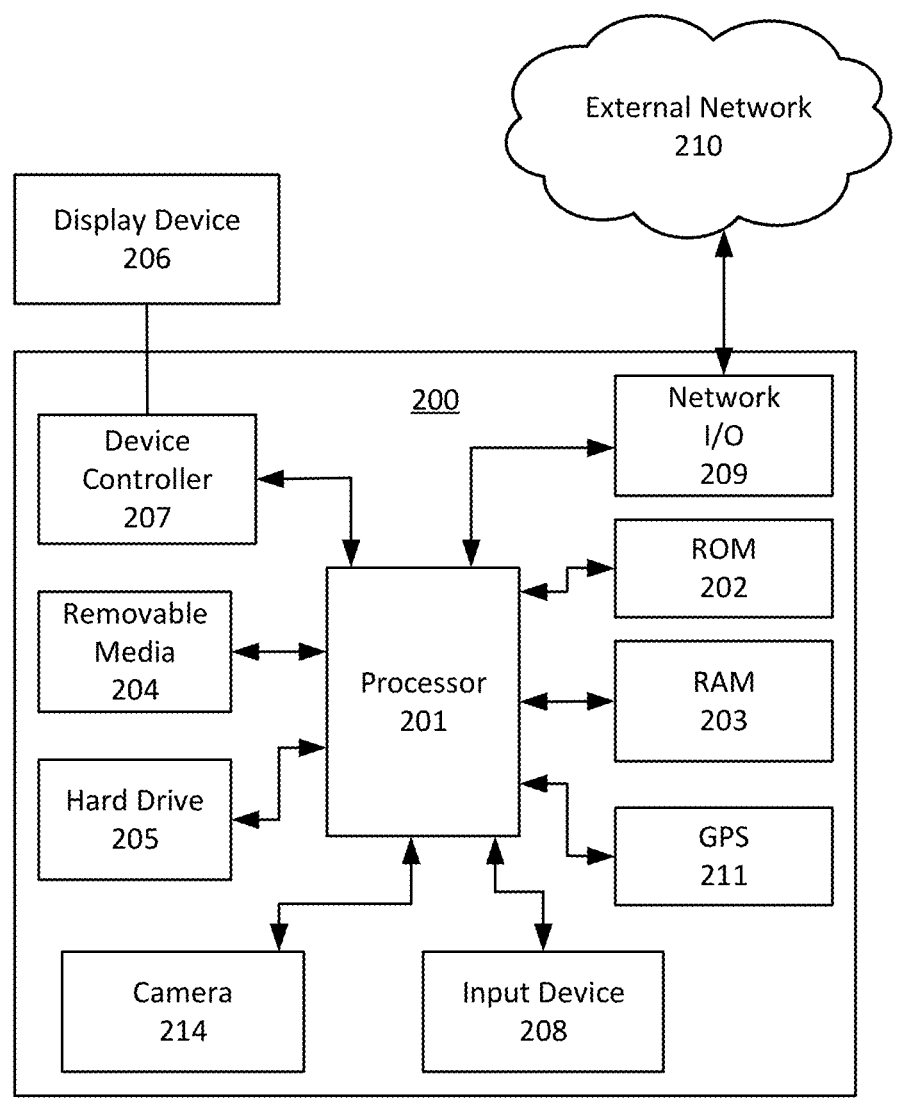
FIG. 2 shows an example computing device that can be used to implement any of the methods, servers, entities, and computing devices described herein.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., motion detection server 122, motion detector device 118, display device(s), content receiver(s), etc.). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a camera 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

The computing device may be located within the premise in which the motion detector is located, and may form, be a part of, or be connected to, the motion detector device 118. Thus, in the examples where the computing device comprises of the motion detector device 118, the camera 214 may be used to perform functions of motion detection, take recordings and snapshots of the field of view, mask areas of the field of view, and trigger alerts based on detected motion in non-masked areas.

However, in some examples, the computing device may also form, or be a part of a remote motion detection server 122. In such examples, a network interface (e.g., network I/O 209) may be configured to establish a connection with one or more content receivers (e.g., set top box/DVR 113) or the motion detector device 118. For purposes of clarity, the motion detection system, which includes the computing device 200, may also comprise one or more of the motion detector device 118 or the motion detector server 122. For example, if the computing device that performs methods described herein comprises of the motion detector device 118, but is at least partly controlled by a remote or in-premise motion detection server 122, the motion detection system may comprise both the motion detector device 118 and the motion detection server 122.

Using processor 201, the motion detection system, e.g., the motion detector 118 and/or server 122, may transmit requests and other signals to the content receiver, e.g., to play a certain multimedia content on display device 206, or determine that an content receiver is playing a certain multimedia content on display device 206. For example, a motion detector 118 at premises 102a may cause a DVR 113 to tune to the 'NBC Nightly News' program, or may simply determine that the DVR 113 is currently outputting the 'NBC Nightly News' program. Furthermore, the display device 206 (e.g., TV screens) need not be physically connected (e.g., wired or annexed) to the motion detection system. Thus, the display device may be a separate device. Additionally, in an example where the motion detection system comprises both a motion detector device 118 controlled in at least one aspect by a motion detection server 122, a motion detector device 118 in a home may not necessarily be physically connected to the motion detection server. However, the motion detector 118 may perform one or more steps of methods described herein, or may be controlled by the motion detection server 122 to perform the one or more steps of methods described herein.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
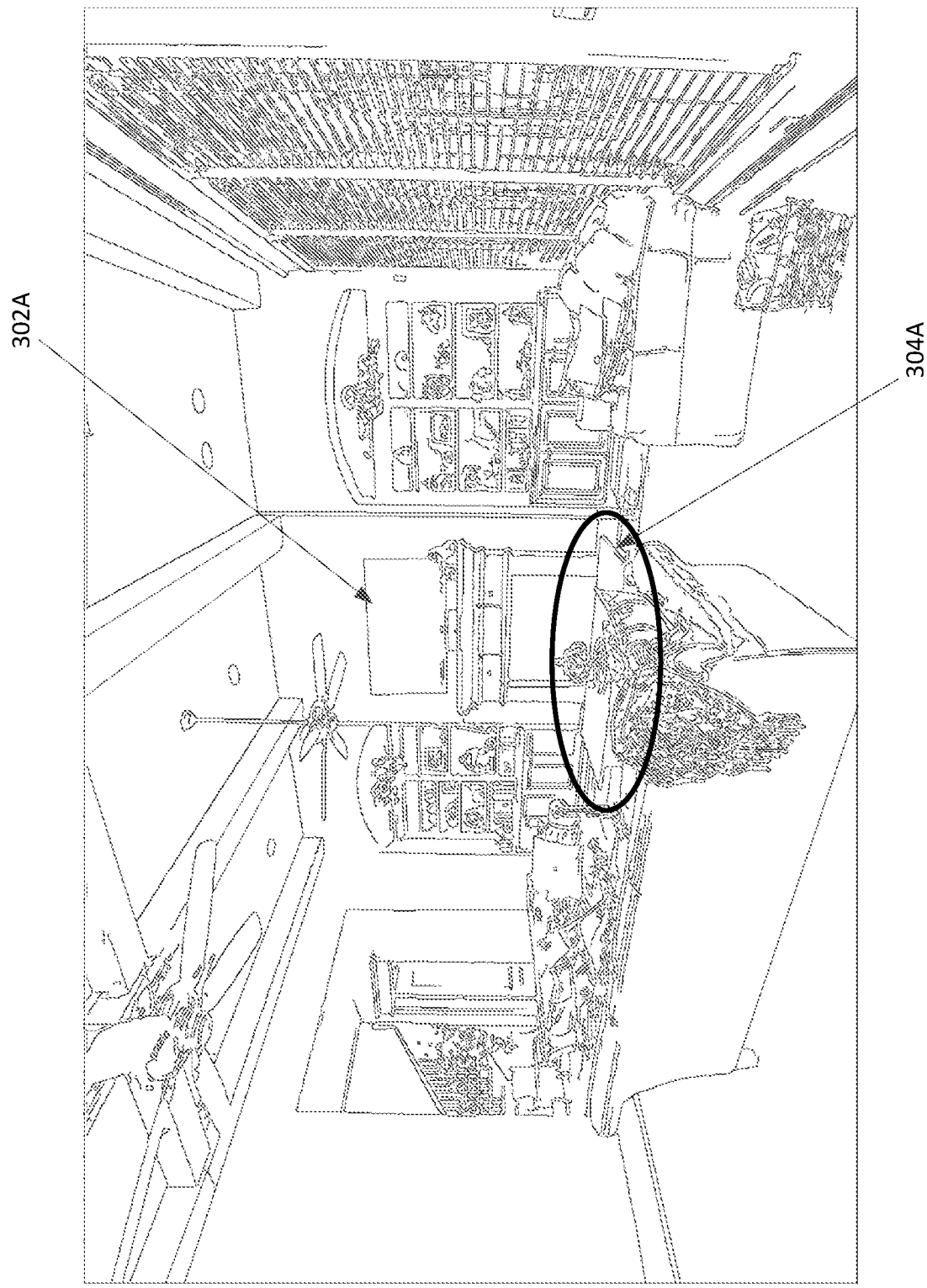
FIG. 3A shows an exemplary field of view for a motion detection system described herein.

FIG. 3A shows an exemplary field of view captured by a camera for a motion detection system described herein. The motion detection system may include a motion detector device 118 that detects motion based on live imaging by a camera 214, which may be a part of or linked to the motion detection system. The field of view may comprise the scope of vision of the camera of the device based on where the device 118 is placed. As shown in FIG. 3A, the motion detector is situated such that the field of view is a living room of a home. The image of the field of view may be processed so that various candidate display devices, including 302A and 304A, may be recognized based on shapes, aspect ratios, and other image features.

Figure 3B:
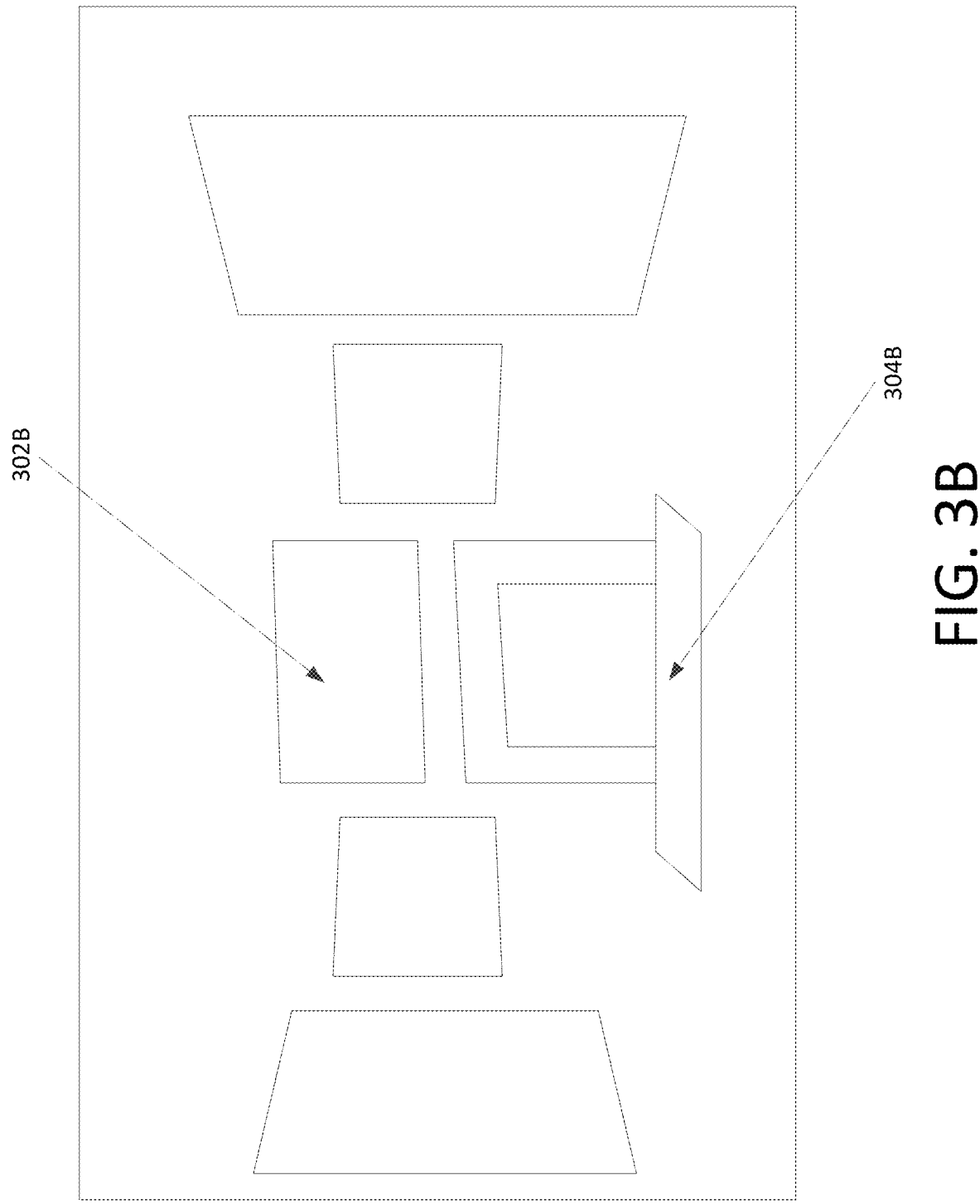
FIG. 3B shows another exemplary field of view for a motion detection system identifying candidate display devices.

For example, FIG. 3B shows another exemplary field of view for a motion detection system identifying candidate display devices, as described herein. As shown in FIG. 3B, the image of the field of view obtained by the camera in FIG. 3A has been processed to reveal lines, curves, and/or shapes from the field of view. Thus, the image in FIG. 3B is a simplified version of the image from FIG. 3A. The image processing to achieve such lines, curves, and/or shapes may be performed using object recognition and digital image processing techniques. Also and alternatively, a motion detector system (e.g., computing device 200 of motion detection server 122 and/or motion detector device 118) may search within an image for known geometrical configurations of display devices. Geometrical configurations may include for example, shapes, measurements (e.g., length, width, height, angle, ratios), aspect ratios, etc., of a display device. Thus, FIG. 3B shows a variety of quadrilateral features (including display device 302B and table 304B) that may be potential candidates for display devices based on their geometrical configurations.

Furthermore, the known geometrical configurations of display devices may be altered based on the position of the camera of the motion detector device with respect to a possible or candidate display device. For example, skew constraints may be determined based on the position of the motion detector system. As shown in FIG. 3B, Potential display devices are identified that match the modified geometrical configurations based on the skew constraints. For example, the motion detector system may determine that known display devices exist in rectangular shapes having an aspect ratio of 4:3. An image of the field of view obtained from the camera of the motion detector device may be processed to identify a plurality of quadrilateral shapes. Of the plurality of quadrilateral shapes, the motion detector system may look for those that are rectangles having an aspect ratio of 4:3. However, the motion detector may determine skew constraints based on the position of the camera of the motion detector device with respect to features having the quadrilateral shapes. The motion detector system may modify a geometrical configuration for the display device it is identifying, for example, by having an oblique quadrilateral having an aspect ratio of 4:3 instead of a 90 degree rectangle.

Using the modified geometric configurations 302B and 304B, the motion detector system may identify 302A and 304A, respectively, as potential display devices. However, as shown in FIG. 3A, only 302A is actually a display device (e.g., TV display), as 304A is a table. Methods described further herein may be used to differentiate and/or filter through the identified candidate display devices to determine the actual display devices.

After actual display devices are identified, motion detected within the display device area (e.g., movies, TV shows, dynamic photos, etc.) may be "masked," e.g., filtered from being detected for motion, as will be discussed further in the present disclosure.

However, while the table 304A may be determined as not being a display device, the table 304A may nevertheless act as a reflective surface for motion displayed within display device 302A.

For example, FIG. 3C shows an exemplary field of view for a motion detection system identifying masked areas. After determining that the quadrilateral 302B in FIG. 3B is indeed of a display device 302A in FIG. 3A, using methods presented herein, the motion detector system may mask the area 302C, as shown in FIG. 3C. Thus movement within the masked area 302C may be filtered, protected, and/or ignored from motion detection operations. For example, a motion detector may be prevented from issuing alerts based on movement caused by a movie being played on the TV screen 302A. Nevertheless, various methods discussed further in the disclosure may also allow the motion detection system to also mask areas displaying motion that is reflected from the display devices. Thus, acting as a reflective surface, table 304C may also be masked. As shown in FIG. 3C, the motion detector system may indicate different categories of masks to differentiate between an actual display device 302C from a reflective surface 304C. Furthermore, a display area may include portions of a field of view of a motion detector that includes display devices and reflective surfaces that may potentially reflect content shown on the display devices.

Figure 4A:
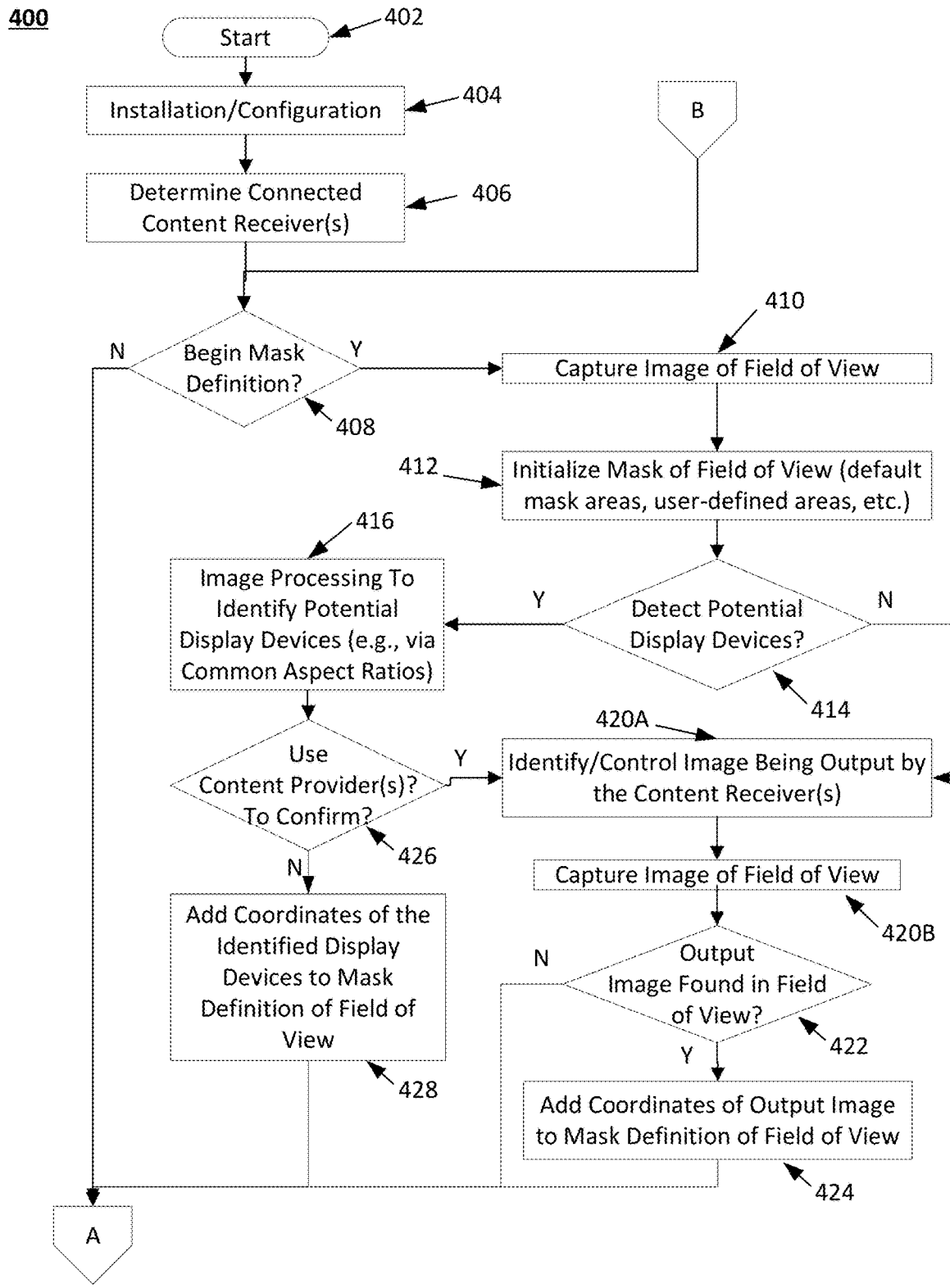
FIG. 4A is a flow chart showing an example method for excluding motion from display devices for motion detection systems.

FIG. 4A depicts a flow chart showing an example method 400 for excluding motion from display devices for motion detection systems. One or more steps of method 400 may be performed by the computing device 200 of one or more of the motion detector device 118, motion detector server 122, another server 105, 106, and 107, and/or a remote computer system controlling motion detector device 118. As described previously in the present disclosure, "motion detection system" may comprise any one or more of these devices, systems, and/or servers. Furthermore, one or more steps of method 400 may be used in the generation of masks for motion detection. A "mask" may comprise an area of an image that may be flagged, protected, and/or filtered out of the image altogether, so as to prevent a motion detector from acting on (e.g., alerting) on any motion detected within the masked area. A processor may "mask" an area of an image by setting the pixel intensity values of the area as zero, and the non-masked areas as non-zero. Thus, wherever the pixel intensity value is zero in the masked area, the pixel intensity of the resulting masked area of the image may be set to a background value.

Figure 4B:
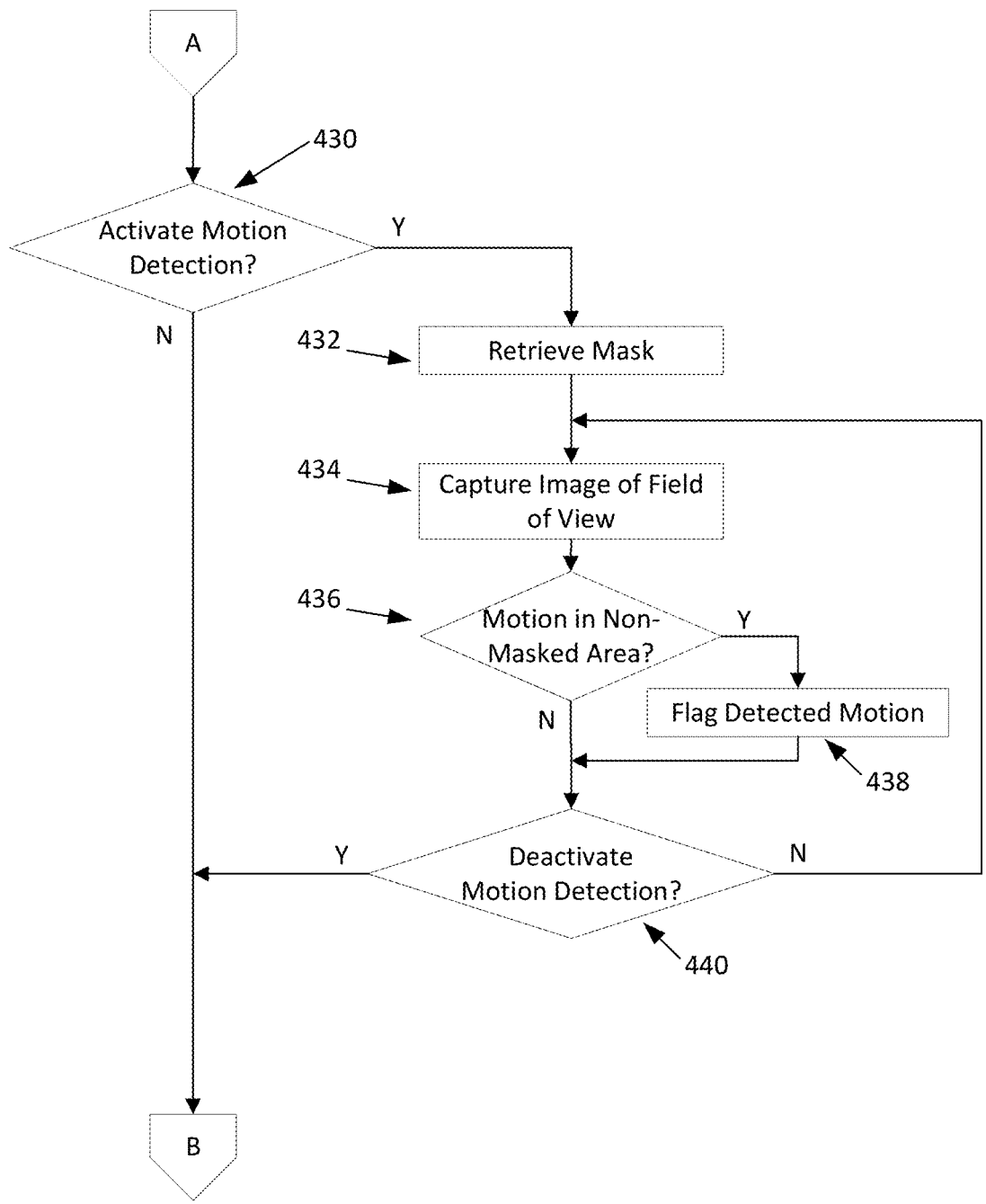
FIG. 4B is another flow chart showing an example method for excluding motion from display devices for motion detection systems.

The masked areas may also be flagged for further processing if desired. For example, after activating a mask and determining that a display device (e.g., TV) is on, motion in the masked area may be compared with expected images in a display device. After defining masks using method 400, as depicted in FIG. 4A, one or more steps of method 450 as depicted in FIG. 4B may be used to perform motion detection routines using the mask definitions, as will be described herein.

Referring to FIG. 4A, step 402 may involve starting the motion detector system. This step may involve powering on one or more of the motion detector device, a camera of the motion detector device, or a component of the motion detector device enabling communication with the motion detector server 122. The user of the system may place the motion detector device and/or camera in a location that would enable the camera to capture and detect motion for a desired field of view. It is also contemplated that this field of view may involve display devices or reflective surfaces that may present motion (e.g., movies, TV shows, screensaver content) that the user would not like the motion detector to detect and/or issue alerts for. Starting the motion detector system may also involve activating the camera of the motion detector, e.g., to prepare for installation or configuration.

Step 404 may include installation or configuration of the motion detection system. For example, the installation or configuration may include receiving a command or defaulting to an operation of configuring manually. The motion detection system may receive one or more inputs by the user for manual configuration. These inputs may include the user manually determining which areas to mask in the camera's field of view. For example, the user may input information identifying various display devices that the user owns (e.g., model, size, product information, etc.). The motion detector system may use this inputted information to locate and/or mask pixels representing the display devices from the field of view. The installation may involve establishing a connection with and/or detecting any one or more content receivers. A content receiver may comprise one or more devices that receives as input, content from one or more content providers or sources, and outputs image or video data to be displayed on the display devices. The content receiver may additionally or alternatively output audio, e.g., to be accompanied with the image. Thus, content receivers may include, for example, a set top box, a TV tuner, an antenna, a digital video recorder (DVR), and the like. If the motion detection system has not received a command for a manual configuration, the motion detection system may determine masks automatically using one or more steps presented further below.

Step 406 may include determining connected content receivers (e.g., DVRs, set top boxes, TVs, etc.). For example, after detecting content receivers (e.g., in step 404), the motion detector system may determine, at step 406, which of the detected content receivers would be used in the one or more steps presented herein for defining masks. In some examples, a user may be prompted to manually confirm whether a detected content receiver belongs to the user or is responsible for outputting (e.g., broadcasting, delivering content to) displays on one or more display devices belonging to the user or existing in the field of view of the motion detector camera. For example, if the motion detector device has access to video output ports, then it can prompt the user to provide information on which ports are used and what display devices are connected to the ports. If the motion detection system is communicatively linked, or has access to, other devices that have video output ports (e.g., a motion detection server at home communicating with a DVR), the same can be done for the video ports on those other devices. Similarly, if the motion detector system and/or connected devices have display screens of their own (e.g., a built-in display), then the motion detector system can communicate with the other device to determine the details of the display (e.g., its size, aspect ratio, etc.).

At step 408, the motion detection system may determine whether to begin mask definition. A mask definition may comprise the creation of or updating of masked areas for a given field of view. There may be an input, or a toggling of an option, by the user to have the motion detection system create or update a previously existing mask definition for the field of view, which would prompt the motion detection system to begin mask definition at step 408. The motion detection system may begin mask definition if it senses that the motion detector and/or camera has a new field of view or has not yet defined any masks for that field of view.

If the motion detection system begins mask definition, step 410 may include capturing at least an image of the field of view. Metadata associated with the captured image may be stored, and this metadata may include a timestamp or other indication of the date and/or time at which the image of the field of view was captured.

Step 412 may include initializing a mask of a field of view. The initialization may involve applying default mask areas or user-defined mask areas. For example, at step 404, if the user had manually entered certain masks for the field of view, these masks may be entered into the initialized mask of the field of view. In some configurations, applying default mask areas may include masking artifacts caused by the motion detector system (e.g., glitches), or masking a pre-selected zone of the field of view. For example, the pre-selected zone may be the bottom tenth of the field of view to exclude, from motion detection, an area frequented by household pets, automated cleaners, etc. In some examples, the initialization may involve activating a masking tool or application to be used in subsequent steps for masking areas of the field of view from motion detection.

At step 414, the motion detection system may determine whether to detect potential display devices via image processing. There may be an input or a toggling of an option by the user to have the motion detection system detect potential display devices using image processing, which would prompt the motion detection system to detect potential display devices using image processing at step 416. For example, a user may decide not to have the motion detector system detect potential display devices via image processing (e.g., aspect ratio), if the user wishes for the motion detector system to rely only on the content provider(s) (e.g., multimedia content providers (e.g., TV channel servers), stored content (e.g., default images, screensavers)) to assist in detecting display devices, e.g., as in step 420. A user may select this configuration, for example, if the user is aware that display devices in the field of view do not fit known aspect ratios. Conversely, if the user is aware that display devices within the field of view whose geometric configurations may be commonly known in the industry, the motion detector system may be selected or configured to detect potential display devices via image processing.

Step 416 may include using image processing to identify potential display devices (e.g., via common aspect ratios) in the field of view. Image processing may involve techniques for identifying potential display devices by transforming or recognizing one or more features from the received image. For example, at least some techniques may involve receiving reference data of a plurality of aspect ratios for the shape of display devices. This reference data may be retrieved from a database or memory of device 200. Also or alternatively, this reference data may be periodically updated via market data on existing display devices. For example, the manufacturers or distributors for display devices or other third parties may have information on the visible features of common display devices. Using networking I/O 209, the motion detection system may reach out to distant servers and computing systems of these display device manufacturers or distributors to collect reference data. The reference data may include known geometrical configurations for display devices, among other visible features. Geometrical configurations may include, for example, shapes, measurements (e.g., length, width, height, angle, ratios), aspect ratios, etc., of a display device. For example, display devices may commonly exist as being rectangular in shape and having common aspect ratios for its rectangular dimensions of 4:3 or 16:9.

The motion detector system may then determine a plurality of candidate shapes for display devices using the reference data. Thus, the motion detection system may look for rectangular shapes within the field of view having a common aspect ratio of 4:3 or 16:9. However, as was discussed in the description above for FIGS. 3A-3B, rectangular shaped objects such as display devices may inevitably appear skewed in an image captured from the motion detector's perspective. Thus, even though a display device may actually be rectangular in an aspect ratio of 4:3, a captured image from the motion detector camera's field of view may show a trapezoidal display device with an altered aspect ratio.

The motion detector system may overcome the limitations posed by skewed dimensions of display device and identify potential display devices based on reference data. For example, the motion detector system may determine skew constraints from the field of view of the motion detector camera. At least some methods for determining skew characteristics may utilize depth recognition techniques. For example, the motion detector system may cast light of a certain shape (e.g., a rectangle) with known geometrical configurations onto the field of view. Depending on the depth of the field of view, the light cast may form a resulting shape (e.g., a trapezoid) that is different from the casted shape. Based on the angles of the resulting shape's vertices or new aspect ratios of the resulting shape, the motion detector system may determine and store skew constraints.

The motion detector system may also or additionally determine skew constraints using known objects with known geometrical configurations (e.g., aspect ratios) that happen to be within the field of view with resulting geometrical configurations that may appear different. For example, the vertices of the shape of a known object displayed in the field of view may be mapped to corners of the object as it is actually known. Any differences or discrepancies may be saved and may be used to form skew constraints. The skew constraints may be used to alter and/or expand the possibilities for aspect ratios or geometrical configurations of known display devices in order to be able to identify the known display devices in the field of view.

Furthermore, when identifying the known display devices in the field of view using the altered or expanded geometrical configurations as a result of skew constraints, techniques may be used to overcome partial blocking of potential display devices. For example, if a lamp blocks a quadrilateral area pertaining to a TV, the motion detection system may be able to still identify the TV based on an expanded aspect ratio of the quadrilateral. In one embodiment, a threshold may be used for determining boundaries for polygonal shapes. Thus, a quadrilateral (or other skewed rectangle) may be recognized from the image data, even if a threshold length of the perimeter or boundary of the quadrilateral is identified. Then for image processing to confirm aspect ratios, the missing perimeter or boundary may be filled in.

After identifying potential display devices (e.g., using common aspect ratios and other geometrical configurations), step 426 may include determining whether content provider(s) may be used to confirm that the identified potential display devices are indeed display devices. For example, if the motion detector system, at step 416, identified a rectangular window as being a potential display device as it had the same aspect ratio as a known TV, the motion detector system may use content provider(s) (e.g., TV channels, stored images or videos, etc.) via content receiver(s) (e.g., set top box, DVR, input output device, etc.) to determine that the rectangular window is not actually a display device. Thus, by using methods involving content provider(s) described herein, the motion detection system may determine that the rectangular window need not be masked form motion detection. The decision to use content provider(s) to confirm may be based on an input or selection by a user to do so.

If, however, the motion detection system decides not to use content provider(s) to confirm, the motion detection system may add the coordinates of the identified display devices to the mask definition of the field of view (e.g., as in step 428). By doing so, motion detection system may exclude motion from the areas of the field of view of the identified potential display devices in the motion detection operations described in method 450 of FIG. 4B (e.g., see A in FIG. 4A). Furthermore, the motion detector system may enable a user to simply indicate (e.g., on a display) where the display devices (e.g., TV) are on a field of view. The motion detector system may use this inputted information to confirm display devices and/or mask pixels representing the display devices from the field of view. In doing so, the user could also indicate which content receivers (e.g., DVR) supplies video or image content to the display devices (e.g., TV).

If the motion detection system had decided in step 414 to not detect potential display devices using geometrical configurations, or if the motion detection system had decided to use content provider(s) to confirm the identified potential display devices, step 420 may include identifying and/or controlling an image or audiovideo program being output by the content receiver(s). The image or audiovideo program may be part of an audiovideo file (e.g., a TV show) streamed to a content receiver within premise 102a by a content provider. Also or alternatively, the image may be a frame of the audiovideo program. The image may also be a default image or screensaver sent to the content receiver by the content provider, e.g., where a content provider is a storage or a user device (e.g., a smartphone that has generated and stored photos). In some examples, the content provider, the content receiver, and/or display device may be a part of one device or system.

Thus, step 420A may involve sending a request to a connected content receiver (e.g., a set top box, DVR, etc.) to output (e.g., display) a default image at a predetermined time. The default image may be a preconfigured image that facilitates an easy recognition by the motion detector system if found within the field of view of the motion detector camera. For example, a default image may be a green screen. As part of a periodic activity or otherwise, the motion detector system may, at step 420B, capture an image of the field of view. At step 422, the motion detector system may determine whether the output default image is found in the field of view. For example, the motion detector system may determine whether the captured image (e.g., from step 420B) shows the default image. This may involve detecting a difference in pixels by comparing the captured image of the field of view from step 410 with a captured image of the field of view from step 420B. Also or alternatively, e.g., where the motion detector system periodically takes images of the field of view, the motion detector system may detect a change in pixels as an area of the field of view becomes the default image.

Also or alternatively, step 420A may involve determining, via the connected content receiver, what content is being streamed. In such implementations, step 420A may occur simultaneously with the motion detector system capturing image(s) (e.g., video stream) of the field of view (e.g., as n step 420B). For example, a motion detector system may determine what multimedia content is being streamed at the moment by a content provider. This may involve prompting the content receiver (e.g., STB, DVR, etc.) to provide the motion detector system with access to or identity of the streamed multimedia content. The motion detector system may also receive, from the content provider itself, at least an image sequence (e.g., short video) of the streamed multimedia content itself. For example, the motion detector system may retrieve from HBO, a "current" image(s) of a movie being streamed, or tune to HBO for a moment and obtain snapshot(s) of the movie being streamed, while the motion detector system simultaneously captures an image of the field of view from its camera. The image(s) obtained from the content provider (e.g., HBO, a user device, etc.) and the image(s) of the field of view may be timestamped to ensure that each set of image(s) are contemporaneous. The content provider and/or content receiver need not provide a full copy of the image(s) of the multimedia content being streamed. A color palette, a portion of the image, or a predetermined threshold number of pixels of an image may be sufficient for the motion detector system.

Also or alternatively, step 420A may involve determining, via the connected content receiver, what content was being streamed at the time of the captured image of the field of view in steps 410 and/or step 420B. The motion detector system may develop a connection with the content provider, or prompt the content receiver (e.g., set top box, DVR) to contact the content provider, in order to determine the content being streamed. For example, if the motion detector system captured an image of the field of view at 4:50 pm EDT, the motion detector system may request a connected set top box to determine what content was being transmitted or streamed, e.g., to any display devices connected to the set top box. The set top box may determine that a TV show from HBO was streamed. The set top box may then obtain an image frame from HBO at 4:50 pm EDT, e.g., by establishing a connection with a server of HBO. The connection may be wireless, indirect, or facilitated by a cloud provider. The set top box, or any other content receiver, may use the image frame at 4:50 pm EDT of the content provided and/or hosted by HBO as the output image being output by the content provider (e.g., HBO). In another example, a content receiver may determine that at 4:50 pm EDT, a stored screensaver image would be played. In such an example, the output image may be the stored screensaver image. Thus, at step 422, the motion detector system may determine whether this output image is found in the image of the field of view, e.g., as captured in steps 410 or 420B. There may be more than one captured image, e.g., one image in step 410 and another in step 420B, to be compared with more than one output image in step 420A, e.g., to account for lag, time shifts in content, glitches, etc. Furthermore, when conducting a comparison between the output image with pixels of the captured image of the field of view, the motion detector system may use a threshold of similarity, or a tolerance to account for minor insignificant differences.

Using one or more of the above-described methods of retrieving an image or audiovideo program streamed by a content provider for a multimedia content, step 422 may involve determining whether a predetermined quantity of the pixels of the image (e.g., of an audiovideo program) can be found in the field of view. For example, an output image can be deemed as found in the field of view if 75% of the pixels of the output image can be located within the captured image of the field of view. By allowing for lesser than all pixels to be found, the motion detection system can address possibilities where an object (e.g., a lamp) partially occludes a display device, causing less than all of the pixels of the output image to be viewable by the motion detection camera.

If the motion detector system has already identified potential display devices in step 416, the motion detector system may expedite the determination at step 422 by comparing the output image to an image of each of the one or more identified potential displays in the captured image of the field of view. Thus, step 422 may involve conducting a pixel-by-pixel comparison for each of the one or more identified potential display devices to confirm which one(s) are an actual display device that may be masked from motion detection operations.

A streamed content outputted by the content receiver to one or more display devices may also be viewable on reflective surfaces (e.g., table 304A in FIG. 3A). Furthermore an image streamed from the content provider or outputted from the content receiver may not necessarily be found in the field of view in the same shape, reflection and/or rotation. For example, as was discussed above, display devices that are typically rectangular may appear in skewed quadrilateral shapes, and the content displayed on these display devices may also appear in such shapes. Thus, determining whether an output image is found in the field of view may also include determining whether pixels (or a predetermined quantity of pixels) of skewed, reflected, and/or rotated versions of the output image are found in the field of view.

If pixels (or a predetermined quantity of pixels) of the output image (or skewed, reflected, and/or rotated versions of the output image) are found in the field of view, the motion detector system, at step 424, may add the coordinates of where the output image (or a predetermined quantity of pixels of the output image) is in the field of view to the mask definition of the field of view. Also or alternatively, the mask definition of the field of view may be updated to reflect the addition of the coordinates of where the output image was found. Also or alternatively, locational information other than coordinates may be used to indicate where the output image is located in the field of view. In further implementations, in addition to or as an alternative to the locational information of the output image within the field of view, the pixels (or the predetermined quantity of the pixels) of the output image may itself be added to the masked definition. Furthermore, the content from the content provider and/or content receiver may be tracked so that the pixels for the entire sequence of frames could be masked. In such implementations, the mask definition may be content-specific instead of location-specific. For example, if an earthquake were to shift the camera of the motion detector device, a new field of view may inevitably result. However, if the motion detection system has the ability to track the pixels, the motion detection system may quickly adjust the masks by recognizing pixels within the field of view.

In one embodiment, if pixels of the output image (or skewed, reflected, or rotated versions of the output image) are not found in the field of view, the motion detection system need not update the mask definition for the field of view. A number of possibilities may explain why an output image is not found in the field of view. For example, display device(s) connected to the content receivers may be turned off or may be located outside of the motion detector camera's field of view. The motion detection system may commence motion detection operations described in method 450 of FIG. 4B (e.g., see A in FIG. 4A).

FIG. 4B depicts another flow chart showing an example method for excluding motion from display devices for motion detection systems. Specifically, FIG. 4B shows an example method for using the masks defined in the example method of FIG. 4A.

Step 430 may include determining whether to activate motion detection. The decision to activate motion detection may be based on an input by a user (e.g., to "arm" the motion detector), for example, when a user departs his or her premise. If the motion detection system is activated, step 432 may include retrieving a mask for the field of view. In one embodiment, each field of view may have a different mask definition as each field of view may present unique features (e.g., locations of potential display devices, reflective surfaces, etc.) to provide masks for. For example, if the camera is moved to a different location, the field of view at the new location captured may not involve the same display devices or the same locations of display devices as was in the previous location. Thus, step 432 may involve determining the current field of view of the motion detector camera. Furthermore, where a motion detector system comprises of multiple cameras, there can be a different field of view for each camera.

After retrieving the mask definition for the field of view, the motion detection system may, as shown in steps 434-440, engage in detecting motion in the field of view through use of the mask(s) defined in method 400 of FIG. 4A. Steps 434 through 440 may be repeated in cycles at predefined increments of time.

For example, step 434 may include capturing an image of the field of view, e.g., via the motion detector camera. The captured image may include metadata that includes a timestamp. Based on the captured image in step 434, the motion detection system may determine whether there is motion in a non-masked area in step 436. A motion may be detected as a trajectory or change in pixels at one or more points of the field of view. Thus, step 436 may include comparing the captured image of the field of view from step 434 with a captured image of the field of view from an earlier time. For example, the captured image from step 434 may be compared with the captured image of the preceding cycle in steps 434 through 440 or with the captured image of the field of view from step 410 in FIG. 4A.

If the motion detection system detects motion in step 436, step 438 may include flagging the detected motion. Flagging may include at least indicating that there is a detected motion. The indication of the flagged motion can be saved, e.g., as a video or image file, into memory (e.g., ROM 202, RAM 203, Hard Drive 205, etc.). The flagging may include issuing an alert based on the detected motion. For example, the motion detection system may send an alert to a user device (e.g., smart phone, smart watch, etc.) of the user, or sound an alarm. In order to ensure that the motion detection system is not hypersensitive (e.g., triggering alerts at the slightest change in pixels), the motion detector system may rely on a degree of difference or a threshold of change in pixels.

In some configurations, the motion detector system may also be determine whether there is motion in a masked area. In such configurations, rather than ignoring the motion, the motion detector system may invoke the content receiver and/or content provider to output an image of a multimedia content being streamed or transmitted e.g., similar to step 420 in FIG. 4A. The motion detector may compare the image streamed from the content provider and/or outputted by the content receiver to an image of the masked area where the motion was detected. The image of the masked area may be a cropped image within the image of the field of view. For the comparison, the output image may be skewed, reflected, and/or rotated, e.g., so as to match the geometric configurations of the image of the masked area in the field of view. For example, it may be possible for the motion detector system to have masked an area of the field of view that was of a TV screen that happened to be running a movie, using methods presented in flowchart 400 in FIG. 4A. However, if a bird were to fly in front of the TV, the motion detector system may be able to detect the motion by comparing captured image(s) of the masked TV screen with the screenshot(s) of the movie being streamed at the same time as the captured images. If a threshold quantity of pixels do not match, the motion detector may proceed to flag the detected motion, as in step 438 described above.

Unless the motion detection system is deactivated, e.g., at step 440, the motion detection system may continue the cycle of steps 434 through 440 to perform motion detection operations. A motion detection system may deactivate based on a user input, or a preconfigured time, condition, or environmental cue (e.g., when the user returns home, after sunrise, etc.).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   capturing, by a computing device associated with a motion detector and a content receiver, an image of a field of view;
   determining, by the computing device and based on object recognition, one or more candidate display areas within the image of the field of view;
   determining, by the computing device, a current image being output by the content receiver;
   comparing, by the computing device, the current image with the captured image of the field of view to determine a matching portion in the captured image;
   generating, by the computing device and based on determining that the matching portion corresponds to the determined one or more candidate display areas within the image, a mask corresponding to the field of view, wherein the mask excludes the matching portion from motion detection; and
   causing, by the computing device, motion detection using the field of view and the mask.

2. The method of claim 1, wherein the determining, based on object recognition, one or more candidate display areas within the image of the field of view further comprises:
   receiving, by the computing device, geometric configuration data corresponding to a plurality of known display areas; and
   determining, by the computing device, the one or more candidate display areas within the image of the field of view using the received geometric configuration data.

3. The method of claim 2, further comprising:
   determining, by the computing device and using the image of the field of view, skew constraints of the field of view; and
   wherein the determining the one or more candidate display areas comprises using the geometric configuration data and the skew constraints.

4. The method of claim 1, further comprising:
   omitting, from the mask, one or more candidate display areas that are not within the matching portion.

5. The method of claim 1, further comprising:
   causing the content receiver to output a default image; and
   wherein the current image being output by the content receiver is the default image.

6. The method of claim 1, wherein the determining the current image being output by the content receiver further comprises:
   determining, by the computing device, a current image of an audiovideo stream being output by the content receiver.

7. The method of claim 1, wherein the comparing the current image with the captured image of the field of view to determine the matching portion in the captured image further comprises:
   determining, by the computing device, a skewed, reflected, or rotated version of the current image; and
   comparing, by the computing device, the skewed, reflected, or rotated version of the current image with the captured image of the field of view to determine the matching portion in the captured image.

8. The method of claim 1, wherein the comparing the current image with the captured image of the field of view to determine the matching portion in the captured image further comprises:
   determining, by the computing device, that at least a portion of the current image is found within the image of the field of view.

9. The method of claim 1, wherein the causing the motion detection using the field of view and the mask further comprises:
   receiving, by the computing device, a request to activate motion detection for the field of view;
   retrieving, by the computing device, the mask;
   capturing, by the computing device, one or more images of the field of view;
   determining, by the computing device, that the one or more images indicate a motion that is not in the mask; and
   generating, by the computing device, an alert based on the indicated motion.

10. The method of claim 1, further comprising:
    receiving, by the computing device, a request to manually update the mask; and
    updating, by the computing device, the mask after receiving one or more user inputs.

11. A method comprising:
    determining, by a computing device via a content receiver, a current image of an audiovideo program being output for display;
    detecting, by the computing device, at least a portion of the current image of the audiovideo program within a field of view of a motion detector;
    generating, by the computing device, a mask to exclude a region of the field of view comprising the at least the portion of the current image; and
    performing, by the computing device, a motion detection operation comprising:
       capturing an image of the field of view of the motion detector;
       determining that the image indicates a motion that is not in the mask; and
       generating an alert based on the indicated motion.

12. The method of claim 11, wherein the at least the portion of the current image comprises at least a portion of a version of the current image that is one or more of skewed, reflected, or rotated.

13. The method of claim 11, wherein the determining, via the content receiver, the current image of the audiovideo program being output for display further comprises:
    causing the content receiver to output a default image for display.

14. The method of claim 11, wherein the determining, via the content receiver, the current image of the audiovideo program being output for display further comprises:
    determining a current image of an audiovideo program being output by the content receiver by determining a channel or program listing.

15. The method of claim 11, wherein the computing device comprises the motion detector.

16. An apparatus comprising:
    one or more processors; and
    memory storing instructions that, when executed by the one or more processors, cause the apparatus to:
        capture, via a motion detector, an image of a field of view;
        determine, based on object recognition, one or more candidate display areas within the image of the field of view;
        determine a current image being output by a content receiver;
        compare the current image with the captured image of the field of view to determine a matching portion in the captured image;
        generate, based on determining that the matching portion corresponds to the determined one or more candidate display areas within the image, a mask corresponding to the field of view, wherein the mask excludes the matching portion from motion detection; and
        cause motion detection using the field of view and the mask.

17. The apparatus of claim 16, wherein the instructions, when executed by the one or more processors, cause the apparatus to determine the one or more candidate display areas by:
    receiving geometric configuration data corresponding to a plurality of known display areas; and
    determining the one or more candidate display areas within the image of the field of view using the received geometric configuration data.

18. The apparatus of claim 17, wherein the instructions, when executed by the one or more processors, further cause the apparatus to:
    determine, using the image of the field of view, skew constraints of the field of view; and
    wherein the instructions, when executed by the one or more processors, cause the apparatus to determine the one or more candidate display areas by using the geometric configuration data and the skew constraints.

19. The apparatus of claim 16, wherein the instructions, when executed by the one or more processors, further cause the apparatus to:
    omit, from the mask corresponding to the field of view, one or more candidate display areas that are not within the matching portion.

20. The apparatus of claim 16, wherein the instructions, when executed by the one or more processors, further cause the apparatus to:
    cause the content receiver to output a default image; and
    wherein the current image being output by the content receiver is the default image.

21. The apparatus of claim 16, wherein the instructions, when executed by the one or more processors, cause the apparatus to determine the current image being output by the content receiver by:
    determining a current image of an audiovideo stream being sent from the content receiver.

22. The apparatus of claim 16, wherein the instructions, when executed by the one or more processors, further cause the apparatus to compare the current image with the captured image of the field of view by:
    determining a skewed, reflected, or rotated version of the current image; and
    comparing the skewed, reflected, or rotated version of the current image with the captured image of the field of view to determine the matching portion in the captured image.

23. The apparatus of claim 16, wherein the instructions, when executed by the one or more processors, further cause the apparatus to compare the current image with the captured image of the field of view by:
    determining that at least a portion of the current image is found within the image of the field of view.

24. The apparatus of claim 16, wherein the instructions, when executed by the one or more processors, cause the apparatus to cause the motion detection by:
    receiving a request to activate motion detection for the field of view;
    retrieving the mask corresponding to the field of view;
    capturing one or more images of the field of view;
    determining that the one or more images indicate a motion that is not in the mask corresponding to the field of view; and
    generating an alert based on the indicated motion.

25. The apparatus of claim 16, wherein the instructions, when executed by the one or more processors, further cause the apparatus to:
    receive a request to manually update the mask corresponding to the field of view; and
    update the mask after receiving one or more user inputs.

26. An apparatus comprising:
    one or more processors; and
    memory storing instructions that, when executed by the one or more processors, cause the apparatus to:
        determine, via a content receiver, a current image of an audiovideo program being output for display;
        detect at least a portion of the current image of the audiovideo program within a field of view of a motion detector;
        generate a mask to exclude a region of the field of view comprising the at least the portion of the current image; and
        perform a motion detection operation comprising:
            capturing an image of the field of view of the motion detector;
            determining that the image indicates a motion that is not in the mask; and
            generating an alert based on the indicated motion.

27. The apparatus of claim 26, wherein the at least the portion of the current image comprises at least a portion of a version of the current image that is one or more of skewed, reflected, or rotated.

28. The apparatus of claim 26, wherein the instructions, when executed by the one or more processors, cause the apparatus to determine the current image of the audiovideo program being output for display by:

causing the content receiver to output a default image for display.

29. The apparatus of claim 26, wherein the instructions, when executed by the one or more processors, cause the apparatus to determine the current image of the audiovideo program being output for display by:
determining, via the content receiver, a channel or program listing.

30. The apparatus of claim 26, wherein the apparatus comprises the motion detector.

31. A non-transitory computer-readable medium storing instructions that, when executed, cause:
capturing, by a computing device associated with a motion detector and a content receiver, an image of a field of view;
determining, by the computing device and based on object recognition, one or more candidate display areas within the image of the field of view;
determining, by the computing device, a current image being output by the content receiver;
comparing, by the computing device, the current image with the captured image of the field of view to determine a matching portion in the captured image;
generating, by the computing device and based on determining that the matching portion corresponds to the determined one or more candidate display areas within the image, a mask corresponding to the field of view, wherein the mask excludes the matching portion from motion detection; and
causing, by the computing device, motion detection using the field of view and the mask.

32. The non-transitory computer-readable medium of claim 31, wherein the instructions, when executed, cause the determining the one or more candidate display areas within the image of the field of view by causing:
receiving, by the computing device, geometric configuration data corresponding to a plurality of known display areas; and
determining, by the computing device, the one or more candidate display areas within the image of the field of view using the received geometric configuration data.

33. The non-transitory computer-readable medium of claim 32, wherein the instructions, when executed, cause:
determining, by the computing device and using the image of the field of view, skew constraints of the field of view; and
wherein the instructions, when executed, cause the determining the one or more candidate display areas by causing using the geometric configuration data and the skew constraints.

34. The non-transitory computer-readable medium of claim 31, wherein the instructions, when executed, cause:
omitting, from the mask corresponding to the field of view, one or more candidate display areas that are not within the matching portion.

35. The non-transitory computer-readable medium of claim 31, wherein the instructions, when executed, cause:
causing the content receiver to output a default image; and
wherein the current image being output by the content receiver is the default image.

36. The non-transitory computer-readable medium of claim 31, wherein the instructions, when executed, cause the determining the current image being output by the content receiver by causing:
determining, by the computing device, a current image of an audiovideo stream being sent from the content receiver.

37. The non-transitory computer-readable medium of claim 31, wherein the instructions, when executed, cause the comparing the current image with the captured image of the field of view by causing:
determining, by the computing device, a skewed, reflected, or rotated version of the current image; and
comparing, by the computing device, the skewed, reflected, or rotated version of the current image with the captured image of the field of view to determine the matching portion in the captured image.

38. The non-transitory computer-readable medium of claim 31, wherein the instructions, when executed, cause the comparing the current image with the captured image of the field of view by causing:
determining, by the computing device, that at least a portion of the current image is found within the image of the field of view.

39. The non-transitory computer-readable medium of claim 31, wherein the instructions, when executed, cause the causing the motion detection using the field of view and the mask by causing:
receiving, by the computing device, a request to activate motion detection for the field of view;
retrieving, by the computing device, the mask corresponding to the field of view;
capturing, by the computing device, one or more images of the field of view;
determining, by the computing device, that the one or more images indicate a motion that is not in the mask corresponding to the field of view; and generating, by the computing device, an alert based on the indicated motion.

40. The non-transitory computer-readable medium of claim 31, wherein the instructions, when executed, cause:
receiving, by the computing device, a request to manually update the mask corresponding to the field of view; and
updating, by the computing device, the mask after receiving one or more user inputs.

41. A non-transitory computer-readable medium storing instructions that, when executed, cause:
determining, by a computing device via a content receiver, a current image of an audiovideo program being output for display;
detecting, by the computing device, at least a portion of the current image of the audiovideo program within a field of view of a motion detector;
generating, by the computing device, a mask to exclude a region of the field of view comprising the at least the portion of the current image; and
performing, by the computing device, a motion detection operation comprising:
capturing an image of the field of view of the motion detector;
determining that the image indicates a motion that is not in the mask; and
generating an alert based on the indicated motion.

42. The non-transitory computer-readable medium of claim 41, wherein the at least the portion of the current image comprises at least a portion of a version of the current image that is one or more of skewed, reflected, or rotated.

43. The non-transitory computer-readable medium of claim 41, wherein the instructions, when executed, cause the determining the current image of the audiovideo program being output for display by:
causing the content receiver to output a default image for display.

44. The non-transitory computer-readable medium of claim 41, wherein the instructions, when executed, cause the determining the current image of the audiovideo program being output for display by causing:

determining a current image of an audiovideo program being output by the content receiver by determining a channel or program listing.

45. The non-transitory computer-readable medium of claim 41, wherein the computing device comprises the motion detector.

\* \* \* \* \*

UNITED STATES PATENT AND TRADEMARK OFFICE
CERTIFICATE OF CORRECTION

PATENT NO. : 11,024,038 B2
APPLICATION NO. : 16/263231
DATED : June 1, 2021
INVENTOR(S) : Heck Page 1 of 1

It is certified that error appears in the above-identified patent and that said Letters Patent is hereby corrected as shown below:

In the Specification

Column 4, Detailed Description, Line 45:
Delete "210" and insert --209-- therefor Column 4, Detailed Description, Line 46:
Delete "209." and insert --210.-- therefor Column 4, Detailed Description, Line 47:
Delete "210" and insert --209-- therefor Column 4, Detailed Description, Line 49:
Delete "210" and insert --209-- therefor Column 4, Detailed Description, Line 51:
Delete "209." and insert --210.-- therefor Column 4, Detailed Description, Line 51:
Delete "209" and insert --210-- therefor Column 4, Detailed Description, Line 56:
Delete "communication" and insert --computing-- therefor Column 4, Detailed Description, Line 61:
Delete "communication" and insert --computing-- therefor In the Claims Column 20, Claim 39, Line 31:
After "and", insert --¶--

Signed and Sealed this
Fourth Day of April, 2023

Katherine Kelly Vidal
*Director of the United States Patent and Trademark Office*